(12) United States Patent
Lee et al.

(10) Patent No.: US 7,130,598 B2
(45) Date of Patent: Oct. 31, 2006

(54) CALLER IDENTIFICATION DISPLAYED ON A PERSONAL COMPUTER

(75) Inventors: Kum Young Lee, Anyang-si (KR); Yeu Cheon Lee, Seoul (KR); Sung Jae Jun, Suwon-si (KR)

(73) Assignee: LG-Nortel Co., Ltd., Seoul (KR)

( * ) Notice: Subject to any disclaimer, the term of this patent is extended or adjusted under 35 U.S.C. 154(b) by 526 days.

(21) Appl. No.: 10/231,143

(22) Filed: Aug. 30, 2002

(65) Prior Publication Data

US 2003/0043982 A1    Mar. 6, 2003

(30) Foreign Application Priority Data

Sep. 3, 2001    (KR) ............................... 2001-53790

(51) Int. Cl.
  *H04M 1/56* (2006.01)
  *H04M 3/42* (2006.01)
(52) U.S. Cl. .................... 455/142.07; 379/142.04; 379/142.06; 455/415
(58) Field of Classification Search ........... 379/142.01, 379/142.04, 142.06, 142.07, 142.12, 142.13, 379/142.15, 142.17; 455/415
See application file for complete search history.

(56) References Cited

U.S. PATENT DOCUMENTS

| 6,480,582 | B1   | 11/2002 | Ungruh et al. |
| 6,665,388 | B1 * | 12/2003 | Bedingfield ............ 379/142.01 |
| 6,807,264 | B1 * | 10/2004 | Booton .................. 379/201.04 |
| 6,891,940 | B1 * | 5/2005  | Bhandari et al. ...... 379/142.06 |
| 2003/0084017 | A1 * | 5/2003 | Ordille ........................... 707/1 |
| 2004/0014456 | A1 * | 1/2004 | Vnnen ........................ 455/413 |

FOREIGN PATENT DOCUMENTS

| CN | 1258405  | 5/1998 |
| WO | 98/54873 | 12/1998 |

OTHER PUBLICATIONS

Office Action issued by Chinese Patent Office Oct. 29, 2004.

* cited by examiner

*Primary Examiner*—Barry Taylor
(74) *Attorney, Agent, or Firm*—Fleshner & Kim, LLP

(57) ABSTRACT

The present invention relates to a novel apparatus and method for providing caller identification. Particularly, the present invention is configured to output caller identification to personal computer and to a terminal. These outputs are in response to a call received by the Caller ID system.

5 Claims, 10 Drawing Sheets

CALLER IDENTIFICATION DISPLAYED ON A PERSONAL COMPUTER

BACKGROUND OF THE INVENTION

1. Field of the Invention

The present invention generally relates to a method or apparatus for displaying Caller Identification on a personal computer.

2. Background of the Related Art

Caller Identification (Caller ID) is a service provided by telecommunication companies to telephone subscribers. When a call is received on a specialized telephone, a screen of the specialized telephone will display the name and/or number of the party calling the telephone. However, this service does have several disadvantages. One disadvantage is that a user with Caller ID service is confined to terminals that have Caller ID systems installed. Second, the Caller ID system does not provide for accumulating data related to the callers to the phone. This is because Caller ID service typically only temporarily stores the calling subscriber number information in the private exchange system for one time use. Afterwards it is cleared off the system. Third, because Caller ID is tied to equipment within telephones, new equipment must be purchased for additional services that are developed. Fourth, the information output by Caller ID service is limited to information relating to the initiation of a telephone call.

SUMMARY OF THE INVENTION

The object of the present invention is to at least overcome the disadvantages of the related art. In embodiments of the present invention, a first signal is inputted from public exchange system. The first signal is processed to produce a second and third signal. The second and third signals are then output. The second signal embodies information that can cause a terminal to output an indication. The third signal embodies information that can cause a personal computer to output information. In embodiments of the present invention, the first signal is a telephone call, the indication is an audio output or a visual output, the terminal is either a mobile telephone or a land line phone, the public exchange system is a public switch telephone network, or the information embodied in the third signal is used by an application program or a web browser of the personal computer. In embodiments of the present invention, the third signal embodies information that can cause a personal computer to output information relating to the telephone call.

Embodiments of the present invention include a private exchange system and a server. The private exchange system is configured to input the first signal from a public exchange system. The private exchange system is also configured to output the second signal which embodies information that can cause a terminal to output an indication. The server is configured to output the third signal that embodies information that can cause a personal computer to output information.

In embodiments of the present invention the private exchange system includes a trunk subscriber adapter, a call processor, a first database, a server interface, a client adapter, an internal subscriber, and a system adapter unit. In other embodiments of the present invention, the server includes an application server, a message handler, a second database, a web browser, and a common gate interface. In other embodiments of the present invention, the apparatus includes an operation maintenance system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
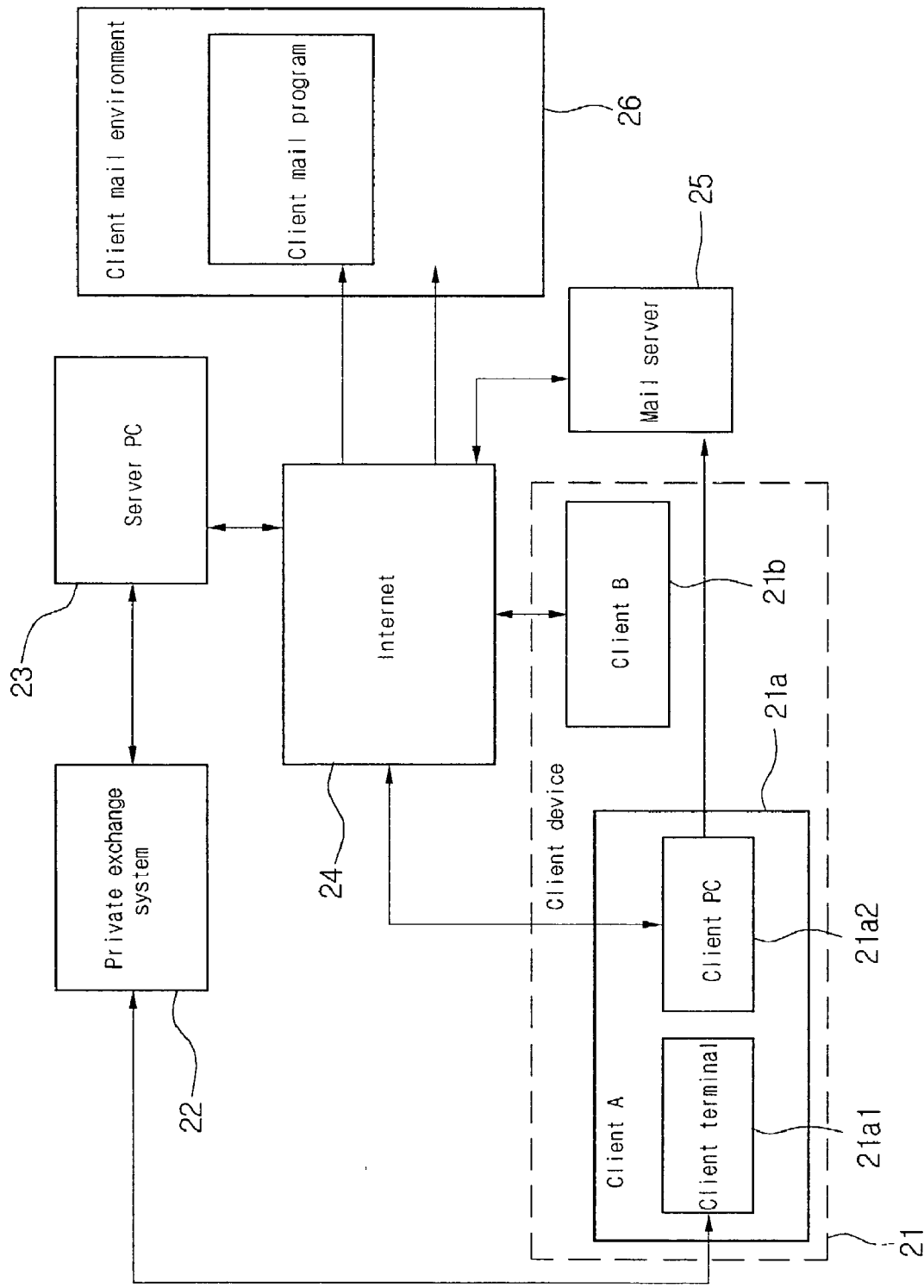
FIG. 1 is a block diagram illustrating a system providing Caller ID.

FIG. 1 is a general block diagram of a system for providing a Caller ID according to the present invention. The system for providing a Caller ID includes a private exchange system 22, a server PC 23, and a client device 21. The private exchange system 22 is connected to a public switched telephone network (PSTN). Server PC 23 is connected to the private exchange system for receiving and managing information. Client device 21 is connected to the private exchange system or the server PC for receiving a Caller ID from the server PC. In embodiments, the system further includes the Internet 24 for using the Caller ID over the Internet, a mail server 25, and a subscriber mail environment 26. The client device 21 includes a Client A 21a having a client terminal 21a1 for receiving a Caller ID and a client PC 21a2, and a client B 21b.

Figure 2:
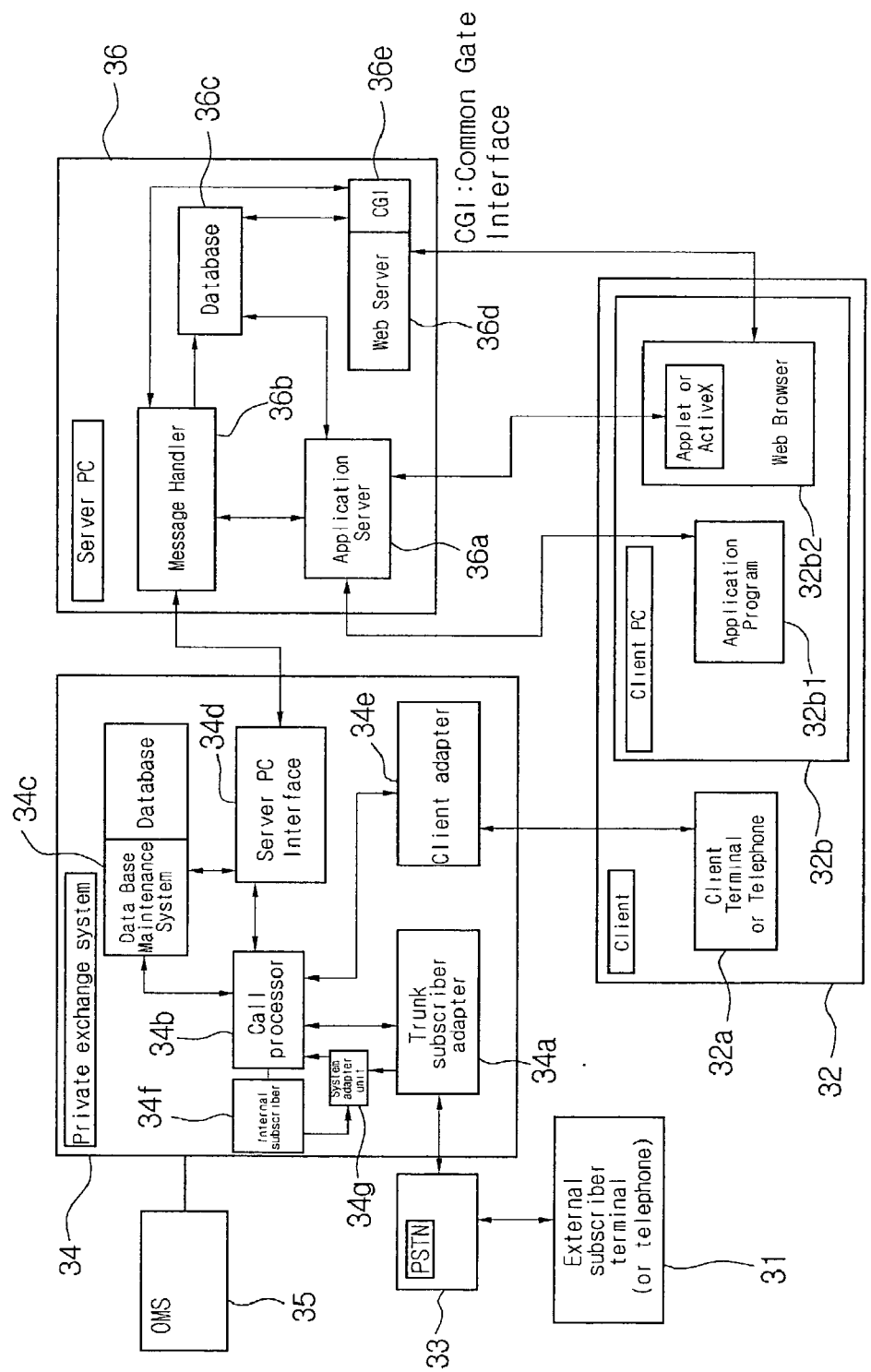
FIG. 2 is a detailed diagram of FIG. 1.

FIG. 2 is a detailed diagram of FIG. 1. As depicted in the drawing, the system includes an external subscriber terminal or telephone 31, a public switch telephone network (PSTN)

33, operation maintenance system (OMS) 35, server PC 36, and client device 32. The external subscriber terminal or telephone 31 is for making a call to a caller. The PSTN 33 is for transferring a call the external subscriber terminal made to a private exchange system 34. The OMS 35 is connected to the private exchange system, which may be a personal computer (PC) necessary to operate the system. Server PC 36 or a server system is connected to the private exchange system, which controls the system to analyze, store and output the Caller ID. Client device 32 is connected to the private exchange system or the server PC for receiving the Caller ID from the server PC.

The private exchange system 34 may include a trunk subscriber adapter 34a, a client adapter 34e, a system adapter unit 34g, a server PC interface 34d, a data management unit 34c, and a call processor 34b. The trunk subscriber adapter is a trunk line local device connected to the PSTN 33. The client adapter 34e is a client local device. The system adapter unit 34g receives a report from the trunk subscriber adapter 34a on a calling party's call. The server PC interface 34d is in charge of information transmission/receipt with the server PC 36, the server system, or a protocol. The data management unit 34c is connected to the server PC interface for managing data. The call processor 34b is connected to each component for performing call process and call management.

The server PC 36, the server system, may include a message handler 36b, a application server 36a, a web server 36d, a database 36c, and a common gate interface (CGI) 36e. The message handler 36b is in charge of information transmission/receipt or protocol between the server PC interface 34d in the private exchange system 34 and decodes the received information. The application server 36a supports programs run by the client unit 32 or allows a client to receive Caller ID. The web server 36d enables a client in the client unit to receive Caller ID through a program for Internet support (e.g., web browser). The database 36c is connected to the message handler and/or the application server for managing information received from the private exchange system. The CGI 36e acts as an interface among the database, the message handler, and the web server.

The client device 32 may include a client terminal 32a and a client computer 32d. The client terminal 32a is connected to the client adapter 34e in the private exchange system. The client computer 32b is connected to the application server 36a and the web server 36d of the server PC. The client computer 32b has a built-in program for receiving Caller ID.

As shown in FIG. 2, embodiments of the present invention are divided into the private exchange system 34, the client PC 32b housed in the client device 32, and the receiving/calling terminal 32a. The private exchange system 34, connected to the PSTN 33, is in charge of an exchange task at a general office and sends relevant information (i.e., Caller ID) to the server PC 36. The server PC 36 stores and manages the information received from the private exchange system. Based on this information, the server PC 36 provides Caller ID to the client PC. The client PC 32b is a personal computer operated by a client and is connected to the server PC for receiving the Caller ID service in real time mode or upon request. The client terminal 32a is an analog or digital subscriber terminal housed in the client adapter of the private exchange system. The client terminal may be a terminal that cannot provide the Caller ID service independently. The calling party terminal 31 is a subscriber terminal for calling a client the private exchange system carries through the PSTN in the external environment.

The call processor 34b is call service software for processing all calls generated in the private exchange system. The primary role of the call processor 34b is to analyze the calling ID and sends the analyzed message information to the server PC interface 34d. The trunk subscriber adapter 34a is a trunk local board included in the private exchange system. One of ordinary skill in the art would appreciate that different kinds of trunk subscriber adapters can be used depending on the type of PSTN. The client adapter 34e is a subscriber local board included in the private exchange system and is divided into different types according to the subscriber. The server PC interface 34d is in charge of message transmission/receipt and protocol between the private exchange system and the server PC. The data management unit and database 34c is a Data Base Management System (DBMS) for managing and storing all data in the private exchange system.

The message handler 36b is in charge of message transmission/receipt between the server PC and the private exchange system. The message handler 36b decodes the messages received from the private exchange system, stores, and manages the messages in the database of the server PC. The application server 36a supports the application program run by the client PC 32b and allows the client to receive Caller ID. The web server 36d helps the client receive Caller ID through the web browser in the client PC. The Common Gate Interface (CGI) 36e is a server application program run by the web server. The CGI 36e acts as an interface among the database, the message handler, and the web server. The database 36c stores the messages received from the private exchange system and manages the information the clients changed.

More than one Operation Maintenance System (OMS) PC 35 may be necessary for system operation. Accordingly, in embodiments, the OMS PC 35 could be combined with the server PC 36. The client device 32 is included with the client PC 32b and receiving/calling terminal 32a. Accordingly, the client can get the Caller ID service from the client PC. The application program 32b1 is for Caller ID service and is already used by the client PC 32b. The protocol and the message configuration between application servers should be in accordance with embodiments of the present invention. The web browser and the applet 32b2 follow the basic Hypertext Transfer Protocol (HTTP) method, being operated by the service from the web server of the server PC. There are two exemplary embodiments for providing the service. A first is to use the web server application program, or CGI. The second is to use the program run by the JAVA applet or the web browser, such as ActiveX.

The private exchange system may be based on Internet Protocol (IP). The client PC 36b may be equipped with an environment which an external web site can be connected. The server PC 36 may be combinable with the OMS PC 35 necessary for the system operation. Further, the mail transmission function may be requested by the clients, through which the calling party number is transmitted to a cellular hand phone or a client mail program of a user PC.

The following is an explanation of the operating procedures of the system according to embodiments of the present invention.

1. How to Initialize the Server PC, or Server System.

Figure 3:
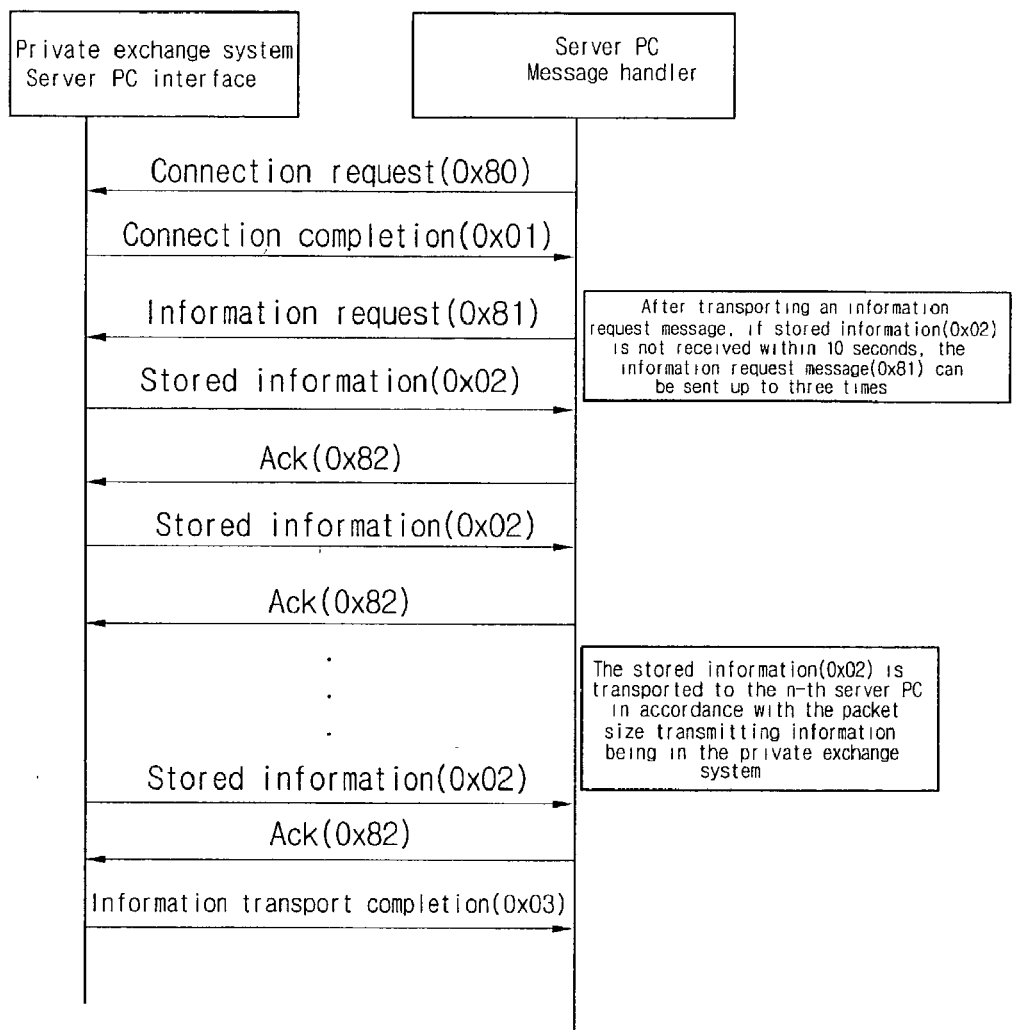
FIG. 3 is a flow chart illustrating a message for initializing a server PC.

FIG. 3 is a flow chart illustrating a message that initializes the server PC. To initialize the server system (server PC) initialization, at first, the message handler housed in the server system makes request the server PC interface in the private exchange system (0×80) to connect. A connection completion message is then transmitted from the server PC interface to the message handler (0×01). Later, the message handler information requests the server PC interface for information (0×81). In response, the stored information is transmitted to the message handler (0×02), and the receiving completion signal is transmitted (0×82).

The transmission of the information request message (0×81) may be transmitted up to 3 times if there is no replay within 10 seconds. In embodiments, the stored information (0×02) is transmitted to n-th server PC in accordance with packet size that transports the information owned by the private exchange system.

The same method describe above can be applied to each protocol especially for performing each service of the present invention (such as, registration, deletion, modification and so forth). The numerals, 0×80, 0×81, . . . , 0×01, 0×02, . . . , are just examples for distinguishing the transmitted/received messages between each system. Therefore, the numerals could be 0×80 or 0×90 as long as two systems agreed to comply with the same rule for transmitting/receiving the messages.

Figure 4:
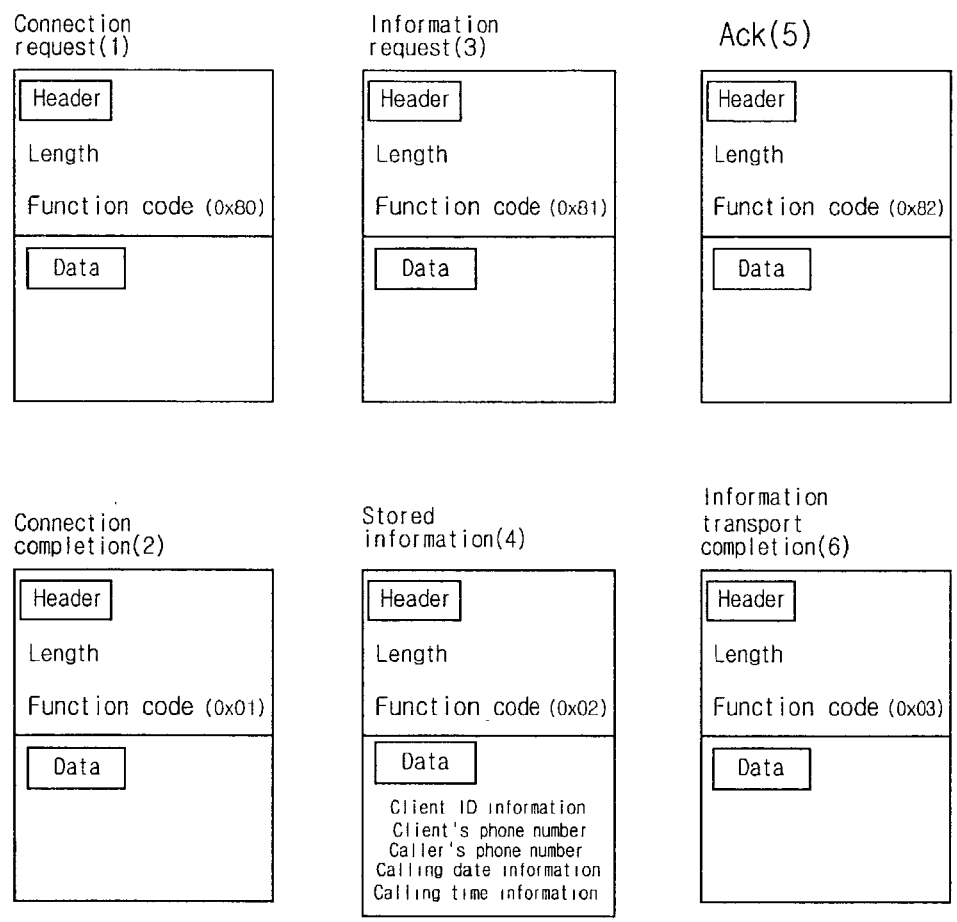
FIG. 4 is a diagram illustrating the message format initialized by the server PC according to the flow chart of FIG. 3.

FIG. 4 is a diagram of the server PC initialization message format according to the flow chart shown in FIG. 3. The server PC initialization illustrated in FIGS. 3 and 4 is a procedure for the server PC connected to the private exchange system, taken by a service manager when the server PC is initially started or restarted that is compatible with the first start, given that the private exchange system is being run and operated all the time, and that the connection to the private exchange system has been tried after the server PC is already installed or at least the repair task is done by the operator. The calling ID information of the private exchange system is modified and managed in real time mode. If the modified relevant information cannot be sent to the server PC, it is temporarily stored in the private exchange system. In normal operation, the server PC requests the private exchange system to send the relevant information and the private exchange system sends the data associated with the Caller ID service (i.e., registration/deletion/modification/service) to the server PC to solve any data discrepancy between the private exchange system and the server PC, thereby completing the initialization process.

Figure 5:
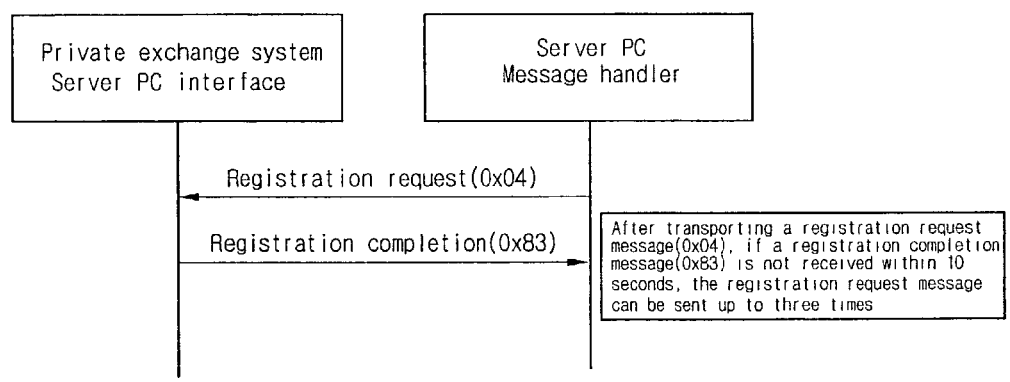
FIG. 5 is a flow chart illustrating a message for registering the service.

2. How to Register Services Including Caller Information to the Server PC, or Server System FIG. 5 is a flow chart illustrating a message for service deletion. To register services to the server system (server PC), a client asking for the caller information requests the message handler of the server system through the server PC interface of the private exchange system to register the caller information service to the message handler of the server system (0×04). Then, concerning this registration request, the message handler transports a registration completion message to the server PC interface.

Figure 6:
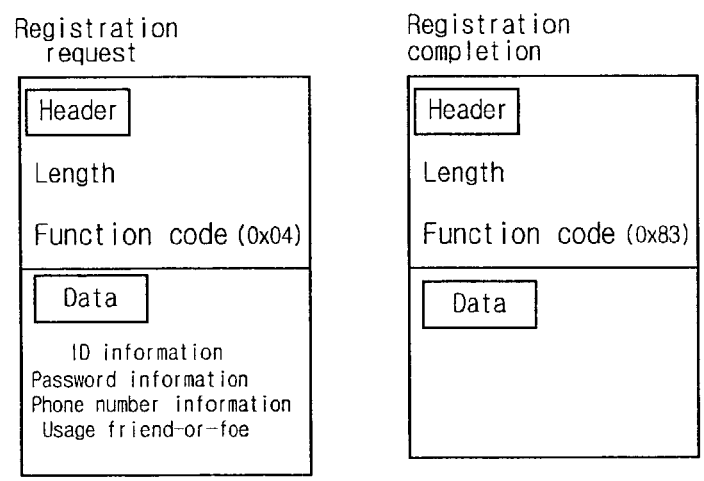
FIG. 6 is a diagram illustrating the service registration message format according to the flow chart of FIG. 5.

FIG. 6 is a diagram illustrating the service registration message format according to the flow chart shown in FIG. 5. In FIGS. 5 and 6, when a client registers to get the Caller ID service, this registered client is provided with a unique ID to get the service from the private exchange system. Particularly, when the client desires to get the Caller ID service they input a Caller ID service registration function code and his or her phone number to the private exchange system using his or her own terminal. In response, the call processor changes the service registration relevant data in the DBMS of the private exchange system and requests the server PC to send a service registration message through the server PC interface (0×04). In this regard, the message handler decodes the registration message received, and registers the message to the database in the server PC.

3. How to Delete the Service By a Client Who Registered the Caller ID (or Information)

Figure 7:
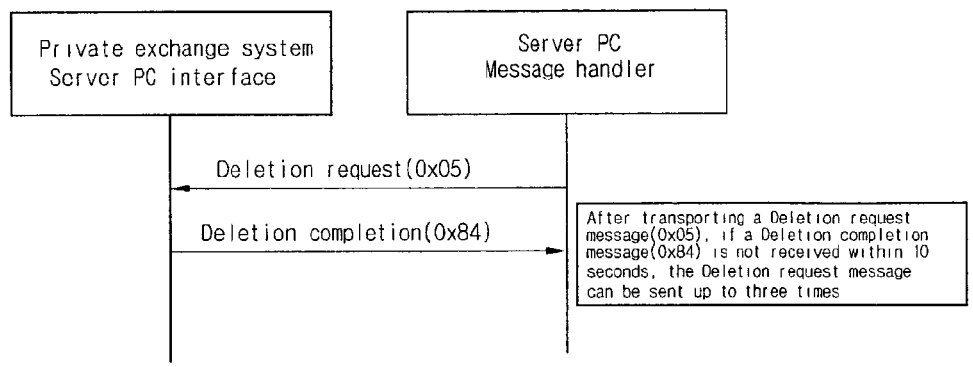
FIG. 7 is a flow chart illustrating a message for service deletion.
Figure 8:
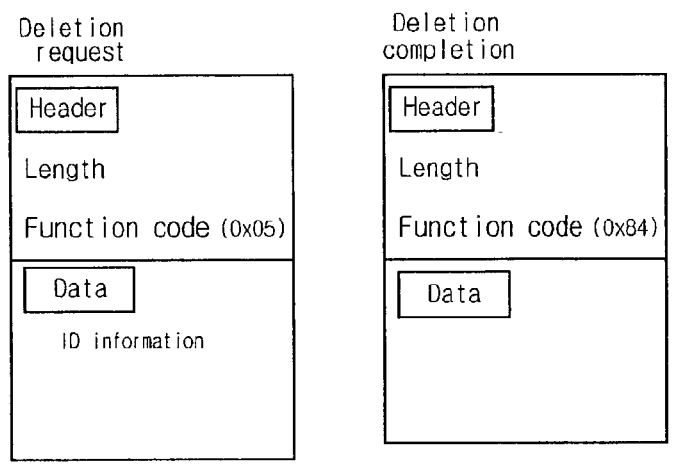
FIG. 8 is a diagram of the service deletion message format according to the flow chart of FIG. 7.

FIG. 7 is a flow chart illustrating a message for deleting the service. FIG. 8 is a diagram illustrating the service deletion message format according to the flow chart shown in FIG. 7. When the client wishes to terminate the Caller ID service, he or she inputs, using his or her own terminal, the calling identity service registration function code and his or her phone number to the private exchange system. Then the call processor in the private exchange system changes the service registration relevant data in the DBMS. After changing the data, the DBMS, under the control of the call processor, requests the server PC to send a service deletion message through the server PC interface. Therefore, the server PC interface transports the deletion message from the server PC to the message handler according to the protocol, and the message handler decodes the deletion message received and deletes the decoded message from the server database.

4. How to Change the Service by the Client Who Registered Calling Information

Figure 9:
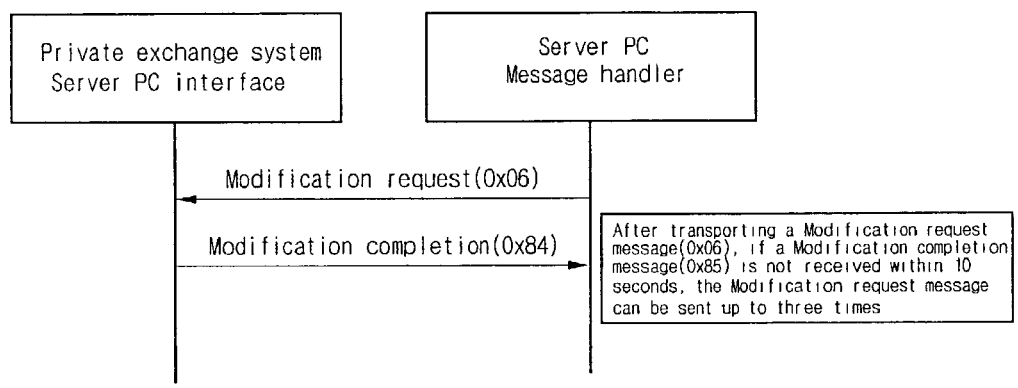
FIG. 9 is a flow chart illustrating a message for service modification.
Figure 10:
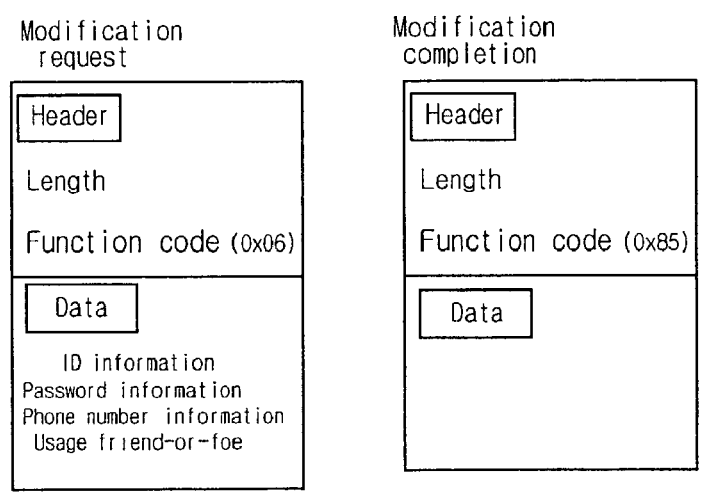
FIG. 10 is a diagram of the service modification message format according to the flow chart of FIG. 9.

FIG. 9 is a flow chart illustrating a message for service modification. FIG. 10 is a diagram of the service modification message format according to the flow chart shown in FIG. 9. When the private exchange system operator wishes to modify part of information of the client who gets the Caller ID service, the operator can do it through the Operation Maintenance System (OMS). In these instances, the client's phone number is changed or the client himself is deleted. Usually, the service modification, more specifically, the modification of the client information associated with the Caller ID service is accomplished through the OMS, the PC necessary for the system operation. First of all, the relevant data to the service in the DBMS is modified, and a request is made to the server PC to send a message for service modification. Then, the server PC interface sends the modification message to the server PC through the protocol. Finally, the message handler in the server PC decodes the modification message received and updates the server database.

5. Caller ID Service

Figure 11:
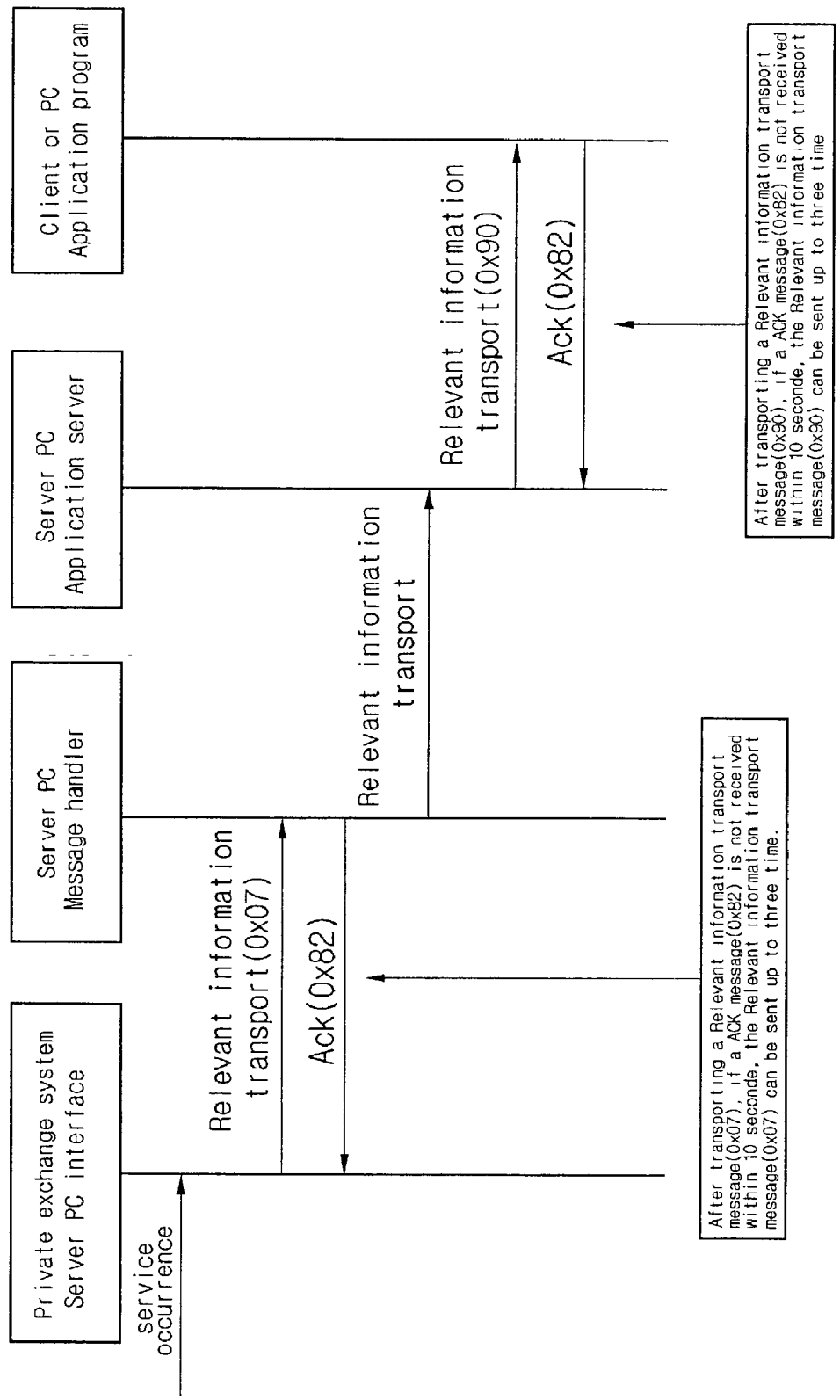
FIG. 11 is a flow chart illustrating a message for caller service call/execution.

FIG. 11 is a flow chart of a message for caller service call/execution. When an external or internal subscriber requests such service, the server PC interface in the private exchange system transports the relevant data to the message handler of the server PC (0×07), and the message handler sends the relevant data received to the application server of the server PC. In addition, the application server transports the relevant data from the message handler to the client PC application program, letting the client output or store the Caller ID (or information).

Figure 12:
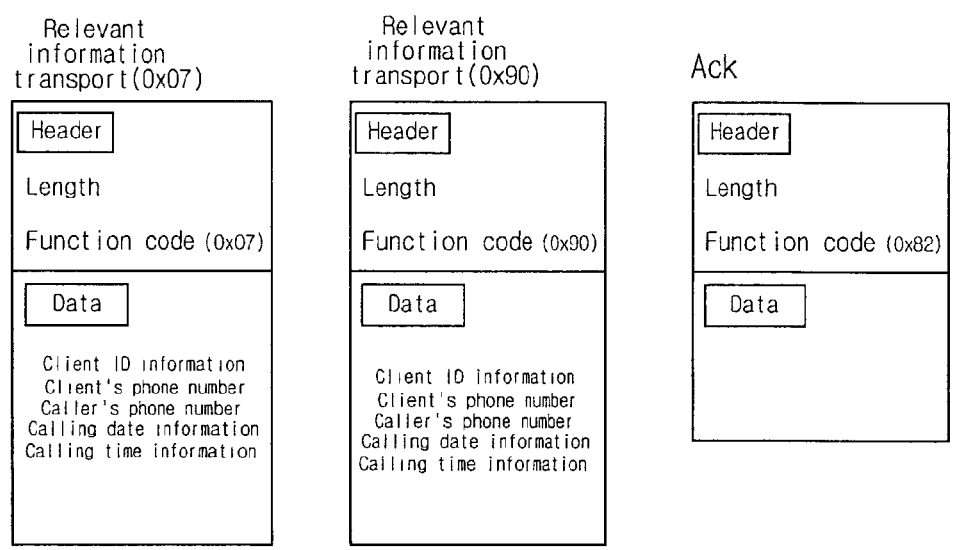
FIG. 12 is a diagram of the service call/execution message according to the caller service message flow chart of FIG. 11.
Figure 13:
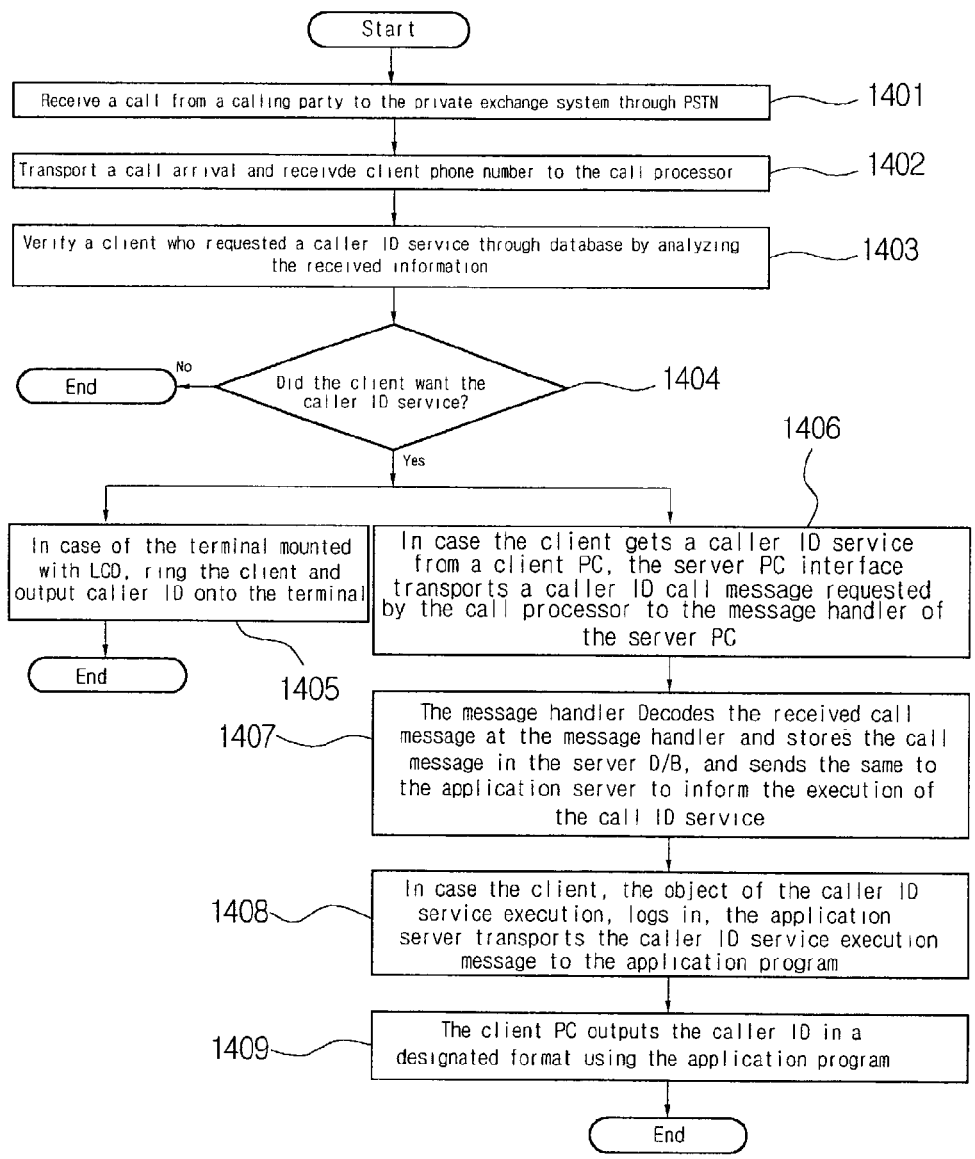
FIG. 13 is a flow chart illustrating a method for providing a Caller ID with respect to FIGS. 11 and 12.

FIG. 12 is a diagram of the service call/execution message format according to the flow chart shown in FIG. 11. FIG. 13 is a flow chart illustrating the process for providing the Caller ID with respect to FIGS. 11 and 12. The method for providing the caller information service includes the steps of: receiving a call made by a calling party at the private exchange system through the PSTN; searching whether the calling party is a client who requested the Caller ID service by analyzing the received information at the call processor; decoding a caller information call message requested by the call processor and storing the decoded call message in the database of the server PC; and outputting the stored call message to the client.

When an external/internal subscriber who is a calling party dials a call, it is received to the private exchange system 34 through the PSTN 33 (S1401). The trunk subscriber adapter housed in the private exchange system notifies the call incoming to the call processor, and sends the digit information (the client phone number) received to the call processor (S1402). The call processor analyzes the received digit information, and verifies whether the analyzed client phone number belongs to the subscriber who registered the Caller ID service, searching in DBMS of the private exchange system (S1403). The Caller ID service is carried out complying with the general formulated or authorized procedure to find out the Caller ID information. The client adapter generates a call ring message and a message for outputting the Caller ID (limited to the digital subscriber and the terminal mounted with the LCD only), and at the same time, it asks the server PC interface to send a service call message. Additionally, the client adapter rings the client according to the message received from the call processor, and outputs the Caller ID onto the terminal. Likewise, the server PC interface sends the service call message the call processor requested to the message handler of the server PC based on the call protocol (FIG. 11) (S1404 through 1406).

The message handler decodes the received call message, and stores the decoded call message in the database of the server PC, the server system. Simultaneously, the decoded content is forwarded to the application server to inform that the service is executed (S1407). The database of the server PC then stores the information associated with the service execution. The application server checks whether the client who is the object of the service execution is currently being logged in, and if the connection is made normally, the application server sends a service execution message to the application program of the client PC according to the pre-designated execution protocol (S1408). The application program run by the client PC outputs the content of the service execution message received from the server in accordance with the self-provided format. If the information the client requested is needed, the application program can request the application server to send the corresponding information (S1409).

The applet output, in embodiments of the present invention, is the program being operated on the basis of the web-browser. It takes the HTTP system, and is basically connected to the web-server of the server PC. Being connected to the web-server, the applet informs its existence to the application server, and obtains a corresponding window. In such environment, the applet simply outputs the Caller ID information to the client in accordance with the service execution message sent from the application server. Also, the web-browser is used when the client connects to the server PC, hoping to get the information associated with the Caller ID who called himself from the client PC. Unlike the web-server, the web-browser is operated by the HTTP system. The client can refer or modify the data in accordance with the service format configuring the web-server.

Embodiments of the present invention relate to an apparatus including: a private exchange system which is connected to Public Switched Telephone Network (PSTN); a server PC which is connected to the private exchange system for receiving and managing information; and a client device which is connected to the private exchange system or the server PC for receiving caller information from the server PC.

Embodiments of the present invention relate to a method including the steps of: receiving a call from a calling party at a private exchange system through a PSTN; analyzing the call at a call processor and searching whether the calling party is who requested a Caller ID service; decoding a calling party information call message the call processor requested and storing the message in a database of a server system; and outputting the call message to a client.

Therefore, according to the present invention, any owner of an analog terminal can enjoy the Caller ID service using his or her own personal computer (PC) without purchasing an expensive digital telephone just because of a calling party number. Additionally, the present invention improves the private exchange system performance overall because the system no longer needs to store information associated with calling party numbers. The present invention not only provides the calling party number but also other information, such as, the date or time the caller made a call. Also, the server PC can store a plurality of calling party numbers, which are managed by the client.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for providing a caller ID in a mobile communication system, comprising:

a private exchange system, which is connected to a public switched telephone network (PSTN), the private exchange system verifying that a caller ID service has been requested from a client after receipt of a call to the client;

a server system, which is connected to the private exchange system for receiving, storing, and managing caller ID information; and a client device, which is connected to the private exchange system or server system for receiving the caller ID information, the client device comprising a terminal and a client computer including an application program;

wherein the private exchange system comprises an interface unit which, is in charge of transmission/receipt of information with the server system or protocol; and a database management system (DBMS), which is connected to the interface unit for managing caller ID data, wherein the server system comprises a message handler, which is in charge of information transmission/receipt or protocol between a server PC interface in the private exchange system and decodes the received caller ID information, a database that stores the caller ID information, and an application server, which supports programs run by the client device that allow, a client to receive the caller ID information, the application server sending the caller ID information to the client computer application program when the client is logged in to the client computer allowing the client to output or store the caller ID information, if the caller ID service was requested from the client, and wherein the private exchange system rings the terminal and outputs a caller ID on the terminal.

2. The apparatus of claim 1, wherein the private exchange system comprises:

a trunk subscriber adapter coupled to the external exchange system;

a call processor coupled to the trunk subscriber adapter;

a first database coupled to the call processor;

a server interface coupled to the first database;

a client adapter coupled to the call processor;

an internal subscriber coupled to the call processor; and a system adapter unit coupled to the trunk subscriber adapter.

3. The apparatus of claim 1, wherein the server comprises:
a message handler coupled to the server interface;
an application server coupled to the message handler;
a second database coupled to the message handler;
a common gate interface coupled to the second database; and
a web server coupled to the common gate interface.

4. The apparatus of claim 1, further comprising an operation maintenance system.

5. A method for providing a caller ID in a mobile communication system, the method comprising:
a first process, wherein a call made by a calling party is received at a private exchange system through a public switched telephone network (PSTN);
a second process, wherein incoming information associated with the call is analyzed in a call processor to verify whether a client associated with the call requested a caller ID service;
a third process, wherein a caller ID call message is decoded by a call processor and stored in a database of a server system; and
a fourth process, wherein the stored call message is outputted to the client,
wherein the caller ID service further comprises;
allowing an external or internal subscriber to request a server PC interface in the private exchange system for the caller ID service;
transporting received relevant information associated with the caller ID service from a message handler to an application server of the server system;
ringing a terminal of the client and outputting the caller ID on the terminal; and
transmitting the received relevant information from the application server to a client PC application program, allowing a client PC of the client to output or store the caller ID.

* * * * *